US012687928B2

(12) United States Patent
Beilner et al.

(10) Patent No.: US 12,687,928 B2
(45) Date of Patent: Jul. 21, 2026

(54) METHOD AND SYSTEM FOR THE OPERATION OF AT LEAST ONE COMPONENT OF A MOTOR VEHICLE

(71) Applicant: AUDI AG, Ingolstadt (DE)

(72) Inventors: Caroline Beilner, Ingolstadt (DE); Michael Grabowski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 281 days.

(21) Appl. No.: 18/156,208

(22) Filed: Jan. 18, 2023

(65) Prior Publication Data

US 2023/0229236 A1 Jul. 20, 2023

(30) Foreign Application Priority Data

Jan. 18, 2022 (DE) .................... 10 2022 101 023.6

(51) Int. Cl.
*G06F 3/01* (2006.01)
*B60K 35/10* (2024.01)
(Continued)

(52) U.S. Cl.
CPC .............. *G06F 3/015* (2013.01); *B60K 35/10* (2024.01); *B60K 35/22* (2024.01); *B60K 35/80* (2024.01);
(Continued)

(58) Field of Classification Search
CPC .......... G06F 3/015; G06F 3/013; G06F 3/016; G06F 3/017; B60K 35/00; B60K 35/10;
(Continued)

(56) References Cited

U.S. PATENT DOCUMENTS

2007/0239230 A1* 10/2007 Giftakis ................. A61B 5/369
607/62
2013/0204153 A1* 8/2013 Buzhardt ................. A61B 5/18
340/575
(Continued)

FOREIGN PATENT DOCUMENTS

DE 102017217812 B4 1/2020
WO WO 2014/092494 A1 6/2014

*Primary Examiner* — Anne Marie Antonucci
*Assistant Examiner* — Luis G Del Valle
(74) *Attorney, Agent, or Firm* — Sterne, Kessler, Goldstein & Fox P.L.L.C.

(57) ABSTRACT

The present disclosure relates to establishing bidirectional communication between a brain wave processing device and a vehicle to control at least one vehicle component of the vehicle. For this purpose, a brain-computer communication channel is provided between the brain wave processing device and the respective vehicle component. Subsequently, a control signal is determined as a function of a brain wave of the operator of the brain wave processing device and transmitted via the brain-computer communication channel to adapt at least one operating parameter of the respective vehicle component. This causes a change in the operating state of the respective vehicle component. Depending on this, an output signal is generated and is assigned to the change in the operating state of the vehicle component. This output signal is transmitted back to the brain wave processing device via the brain-computer communication channel and is output to the operator by means of an output unit of the brain wave processing device.

10 Claims, 1 Drawing Sheet

(51) Int. Cl.
  *B60K 35/20* (2024.01)
  *B60K 35/22* (2024.01)
  *B60K 35/80* (2024.01)
  *B60K 35/85* (2024.01)
(52) U.S. Cl.
  CPC .............. *B60K 35/20* (2024.01); *B60K 35/85* (2024.01); *B60K 2360/589* (2024.01)
(58) Field of Classification Search
  CPC ........ B60K 35/20; B60K 35/80; B60K 35/85; B60K 2360/589; B60K 35/22; B60K 2360/164; B60K 2360/166; B60K 2360/167; B60K 35/25; B60K 35/26; B60K 35/28; A61B 5/383; A61B 5/4848; A61B 2560/0242; A61B 5/165; A61B 5/291; A61B 5/372; A61B 5/386; A61B 2503/22; A61B 5/18; H04W 4/40; B60R 16/02; B60W 50/08
  See application file for complete search history.

(56) References Cited

U.S. PATENT DOCUMENTS

| | | | | |
|---|---|---|---|---|
| 2020/0371515 A1* | 11/2020 | Westbrook | ............ | G06F 3/0346 |
| 2021/0327447 A1* | 10/2021 | Maeng | ................... | H04R 3/005 |
| 2023/0353998 A1* | 11/2023 | Chen | ....................... | H04W 4/80 |

* cited by examiner

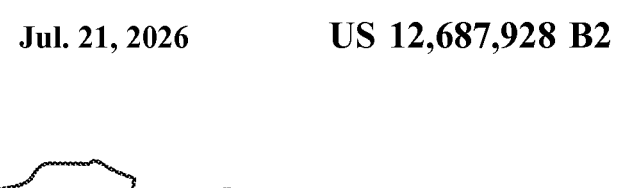

METHOD AND SYSTEM FOR THE OPERATION OF AT LEAST ONE COMPONENT OF A MOTOR VEHICLE

TECHNICAL BACKGROUND

The present disclosure relates to a method and a system for operating at least one vehicle component of a vehicle. For this purpose, a brain wave processing device is employed in the present disclosure, by means of which a control command for the respective vehicle component can be determined as a function of a brain wave of an operator. The control command is transmitted to the respective vehicle component via a brain-computer communication channel in order to correspondingly control said component. Therefore, the aim is to control the vehicle or the vehicle component by means of thoughts.

BACKGROUND

Nowadays, the communication between the vehicle and the vehicle owner or the driver, i.e. the operator, when traveling or while stopped, is for example via the vehicle key, the accelerator pedal and various haptic, or acoustic, or optic control elements. Communication via an application (app) on a mobile terminal of the operator is also possible. To operate the vehicle, i.e., to control it, therefore requires, for example, the eyes, the voice, fingers, hands and feet of the operator. This can restrict the individual freedom of the operator during travel.

As a matter of perspective, digitization continues to advance, and vehicles are to be driven autonomously in the future, for example. In the next few years, new functions and types of communication between driver and vehicle can therefore arise. Operation via haptic control elements or hardware could then be classified as obsolete technology.

An innovative type of communication can be, for example, to carry out communication between vehicle and driver by means of a brain wave processing device via a brain-computer communication channel. For this purpose, for example, an implanted microchip in the brain of the customer or an electrode cap, such as is known, for example, from an EEG (electroencephalogram) can be used to assume the communication or interaction of the driver with the vehicle on the basis of a brain wave or a brain activity, i.e., the thoughts of the operator. Various examples of brain-computer communication are known from the prior art.

DE 10 2017 217 812 B4 discloses, for example, a motor vehicle with a headrest which comprises a brain-computer interface. When a brain control mode is activated, a display and operating system of the motor vehicle can be controlled by means of the brain-computer interface.

Furthermore, US 2020/0371515 A1 discloses a brain-machine interface for controlling different vehicle functions based on a detected user intention. For example, a driving maneuver or the operation of an infotainment system can be executed in this way.

Furthermore, WO 2014/092494 A1 discloses the control of a vehicle by means of EEG detection.

BRIEF DESCRIPTION OF DRAWINGS/FIGURES

FIG. 1 shows a schematic representation of a system for controlling a vehicle component of a vehicle by means of a brain wave processing device.

DETAILED DESCRIPTION

It is the object of the present disclosure to extend the possible applications for communication between a vehicle and a brain wave processing device using a brain-computer communication channel.

The object is achieved by the objects of the independent claims. Advantageous further developments are disclosed by the dependent claims, the description, and the FIGURE.

The present disclosure is based on the knowledge that the brain-computer communication channel can be used bidirectionally. Therefore, the brain wave processing device for reading out the brain wave be used both as a transmitter and as a receiver. For example, the operator can be informed or warned of changes in the vehicle function that result from the thought-based control.

For this purpose, the present disclosure proposes a method for operating at least one vehicle component of a vehicle. According to the method, a brain-computer communication channel is first provided between a brain wave processing device and the respective vehicle component. The brain-computer communication channel can provide a wireless communication link. For example, it can be a radio link or a WLAN connection.

A control signal, which comprises a predetermined control command for the respective vehicle component, is then transmitted via the brain-computer communication channel as a function of the brain wave of an operator of the brain wave processing device. The control command encodes or comprises the information as to which vehicle component(s) is to be controlled, as well as a desired change in state or function for the respective component. The brain wave processing device can therefore be configured to detect and evaluate the brain wave of the operator. How the reading out and evaluation of brain waves can be generally implemented is, for example, sufficiently known from the use of an EEG. Specific embodiment options for the brain wave processing device will be described in more detail later. The operator can, for example, be an occupant or a driver of the vehicle.

Subsequently, the control signal is transmitted via the brain-computer communication signal to adapt at least one operating parameter of the respective vehicle component, thereby causing a change in its operating state. This means that, by controlling the respective vehicle component with the control signal, the function or operating mode thereof, for example, can be adapted. For example, a volume can be increased or raised as an operating parameter for a radio as a vehicle component. As a result, the corresponding radio signal, for example music, can be played louder, which corresponds to the change in operating state. The radio as a vehicle component was selected in the present case and in the following merely for a better understanding of the implementation of the method. Of course, any predetermined vehicle function can be controlled by controlling the corresponding vehicle component using the brain wave processing device. Further embodiments are described in more detail later.

Depending on the adaptation of the operating parameter, an output signal is subsequently generated which is assigned to the change in the operating state of the vehicle component. The output signal can describe the change in state, for example. This means that the output signal can provide information about the change in state or the new operating state. For example, the output signal can comprise the new volume value of the radio as output value or information. Additionally or alternatively, the output signal can correspond to an output of the vehicle component which results from the change in operating state. Therefore, for example, music can be provided by the radio at the new volume as the output signal.

The corresponding output signal is then transmitted via the brain-computer communication channel to the brain wave processing device in order to output the output signal to the operator by means of an output unit of the brain wave processing device. Therefore, the output signal can be displayed or played, for example, to the operator.

This results in the advantage that complete vehicle interaction and/or control is possible, so to speak, by means of thoughts. No external device inputs are necessary, for example, via the voice, a key entry, or other user interactions. As a result, the movement and control of the vehicle is also possible for people who are injured or have limited motor skills such as, for example, persons who are paralyzed. As a result, for example, the vehicle control can also be enabled without intervening with the steering wheel in emergency situations for autonomous, i.e., self-propelled, vehicles. By outputting the output signal via the brain wave processing device, it is also advantageous that corresponding output devices no longer have to be installed in the vehicle; moreover, the change in state can be communicated directly to the operator via the brain wave processing device. Therefore, for example, the operator no longer needs to divert his gaze from the road to a corresponding display device of the vehicle in order to learn the current vehicle state. As a result, the attention of the operator can remain directed at the traffic situation.

The present disclosure also includes embodiments which result in additional advantages.

According to one embodiment, the respective operating parameter and the respective vehicle component have at least one of the following embodiments: A first embodiment relates to a driving setting of a driver assistance system or of a drivetrain. This means that, for example, a steering angle, an acceleration, a speed, and/or a roadway lighting, and/or any other predetermined driving setting can be adapted. The changed operating state can therefore be a driving maneuver or a traffic-relevant or safety-relevant function.

A second embodiment relates to a navigation setting of a navigation device. For example, a desired destination can be input and/or an intermediate stop can be inserted as a navigation setting. Additionally or alternatively, the use of certain road categories, such as the avoidance of toll roads, can be set. Therefore, the changed operating state can relate to the adaptation of route guidance.

The third embodiment relates to an adjustment of an infotainment system. The infotainment system can comprise, for example, a radio and/or a television. For example, a volume and/or a station can be corresponding set. Additionally or alternatively, the adjustment can comprise a device coupling of a mobile terminal (smartphone, smartwatch, tablet) of the operator to the infotainment system, for example for performing a so-called carplay function.

A fourth embodiment relates to a comfort setting of the comfort system for the operator. A corresponding comfort setting can be, for example, a temperature setting of a seat heater and/or air conditioning system. Additionally or alternatively, for example, the position of a window lifter, and/or the color and/or activation of an interior lighting is conceivable. It therefore does not involve adapting safety-relevant or driving-relevant functions of the vehicle.

A fifth embodiment relates to a setting of at least one actuator of the vehicle which is configured to control the vehicle component. The actuator can be, for example, a servomotor of a window lifter in order to open or close a vehicle window. Alternatively, the actuator can be a control device for setting or releasing an electronic hand brake. Therefore, any desired vehicle function, which has been previously activated for example by operating a control knob in the vehicle, can now be implemented by thought control by means of the brain-computer interface.

A sixth embodiment relates to a setting of a communication interface of the vehicle which is configured for data transmission with a vehicle-external communication unit. By means of the communication unit, data transmission or communication with devices, i.e., communication units, outside the vehicle can therefore take place. For example, the Internet can be accessed, a telephone call can be held, and/or social media content can be consumed or shared. The communication unit can accordingly be a server device, such as an Internet server. Additionally or alternatively, the communication unit can be a mobile terminal, for example a smartphone, a tablet or a smart watch. The communication interface can comprise, for example, an antenna module. By means of the communication interface, a mobile radio connection, and/or Internet connection, and/or WLAN connection can therefore be provided, for example. The communication interface can be comprised, for example, of the vehicle antenna of the vehicle.

The design options of the operating parameter and the vehicle component do not need to be limited by the aforementioned embodiments. This means that any other embodiments can be provided for the respective operating parameter and the respective vehicle component.

According to a further embodiment, the control command from the detected brain wave is determined or reconstructed for transmitting the control signal. Thereafter, the determined control command is assigned to the respective vehicle component according to a predetermined assignment rule. The control signal is specified depending on the respective vehicle component encoded in the control command and the desired change in the operating state encoded in the control command.

Therefore, by means of a known evaluation algorithm as is used for the evaluation of an EEG, for example, the brain wave can be evaluated for detecting the vehicle component to be addressed and the desired change in operating state. The corresponding control signal is then generated depending on the vehicle component and the previously increasing change in operating state. For the assignment according to the assignment rule, the control command can be compared, for example, to a predetermined command set which can be stored in a memory unit. The predetermined command set can comprise a plurality of predetermined control commands. Exactly one or more corresponding vehicle components and a desired setting for the operating parameter is or are predetermined for each predetermined control command. The comparison can be used to check whether the control command determined from the brain wave matches one of the predetermined control commands of the command set.

According to a further embodiment, an acoustic, and/or visual, and/or haptic, and/or olfactory, and/or gustatory signal is provided as the output signal. This means that the output signal can comprise, for example, output data which, while being processed by the respective output unit, trigger a corresponding stimulus or a corresponding feedback on the part of the operator. Overall, all five basic senses of the operator can therefore be addressed by the versatile design of the output signal.

According to a further embodiment, the brain wave processing device for detecting the brain wave has an electrode array for being placed on a head, or at least within a predetermined vicinity of the head, of the operator. In addition, the brain wave processing device for outputting the output signal has a display device, and/or a speaker system, and/or a vibration system.

The electrode array can comprise, for example, one or more electrodes which are fastened or attached to the head, i.e., to the skull, or in the vicinity thereof, for measuring the brain wave. For example, the electrode array can be integrated into a cap or a helmet that the operator can place on or pull onto the head for the control. Therefore, a non-invasive measurement of the brain wave can take place. In the present case, vicinity means that the electrode array does not need to touch the head of the operator directly. It is sufficient if the electrode array is arranged in the region surrounding the operator's head, for example, at a distance of a few millimeters up to a maximum of a few centimeters, for example one to ten millimeters.

The display device can, for example, be a display that is comprised of a visor of a brain wave processing device configured as a helmet. The vibration system can be realized, for example, by one or more vibration motors which are incorporated into the brain wave processing device. The speaker system can comprise, for example, one or more speakers or sound converters, as are known for example from headphones. These can, for example, comprise the brain wave processing device and, for example, be arranged or attached in an ear region of the operator.

According to a further embodiment, the brain wave processing device for detecting the brain wave and for outputting the output signal has a stimulation unit with an electrode array. The stimulation unit is configured on the one hand to detect nerve pulses which form the brain wave of the operator. On the other hand, the stimulation unit is configured to convert the output signal into a predetermined pulse pattern made up of predetermined electrical pulses for nerve stimulation to trigger an action potential.

That is, the brain wave processing device is suitable or configured for direct nerve stimulation. For this purpose, the electrode array can have one or more electrodes. These can be implanted in the brain of the operator in a desired sensory center or on the nerve to be stimulated. For example, the electrode array can be in the form of a microchip which is suitable for implantation in the brain of the operator. By outputting the pulse pattern via the electrode array, the excitation of a nerve or nerve cells in the brain can therefore be made possible in the sensory node in the brain. The respective sensory node can be, for example, in a sensory node for the aforementioned five base senses, namely: sight, hearing, feel, taste, and smell. Such nerve stimulation is sufficiently known, for example, from cochlear implants for stimulating the auditory nerve. The pulse pattern can comprise, for example, 250 to 3000 pulses per electrode per second. The pulses can be configured, for example, as a square pulse and, for example, have a current intensity of 10 to 150 microamperes.

By stimulating the auditory nerve, for example, a warning signal or voice signal, such as music or a telephone call or a podcast, can be provided to the "inner ear" of the operator. By stimulating the optic nerve, for example, information such as, for example, a symbol or a warning symbol which reflects information about the operating state such as a volume setting of the radio, can be provided to the "inner eye" of the operator. A real situation in the surrounding region or a perception can therefore be replicated or simulated for the operator by stimulating the nerve cells. For example, the operator can feel a vibration of the steering wheel without the steering wheel actually vibrating. Corresponding embodiments for the simulation of perceptions are of course also possible for the other of the aforementioned senses.

According to a further embodiment, the brain-computer communication channel, i.e., the data transmission via the brain-computer communication channel and/or the use of the control signal for controlling the respective vehicle component, is enabled or activated only when an activation signal is detected by means of an activation device assigned to the respective vehicle component. As a result, the control of the vehicle by means of the brain wave processing device can be protected against unwanted external access. In addition, it can thereby be prevented that, for example, "normal thoughts" are interpreted as a control command and the vehicle component is therefore inadvertently controlled.

The activation signal can comprise, for example, an activation command. The activation command can be, for example, a passphrase or a password that the operator enters via the activation device. For example, the activation device can be comprised by the brain wave processing device. It is therefore sufficient if the operator thinks the activation command for the authentication or release. The activation command can therefore be determined like the previously described control command from the brain wave of the user. Alternatively, the activation device can be comprised, for example, by the vehicle or the mobile terminal of the operator. Accordingly, the activation device can be configured as a fingerprint sensor and/or a camera system for gesture or facial recognition of the operator. Therefore, the activation signal can comprise activation data by which an unambiguous identification of the operator is possible. The activation signal can be queried before each control command is implemented for a driving-dynamics or driving-relevant adjustment of the operating state. Road traffic safety can therefore be ensured.

According to a further embodiment, a control command which relates to the adjustment of a driving setting as an operating parameter of a driver assistance system is verified prior to execution by environmental data of an environment being included by means of a detection device of the vehicle, and a value of the operating parameter to be adapted by the control command being compared to a current value of the environmental data.

Therefore, prior to the execution of a driving maneuver, it can be ensured that the operator has given a control command that conforms to the traffic rules or traffic conditions, for example, and/or the brain wave processing device has correctly understood the control command. For this purpose, prior to the execution of the control command, for example, sign detection, and/or navigation map reading, and/or object recognition, and/or collision detection, and/or facial expression or gaze direction recognition, and/or weather forecasting, and/or current weather data can occur. The monitored environment can relate, for example, to a vehicle interior or a perimeter around the vehicle. The environmental data can comprise, for example, traffic data, and/or weather data, and/or a road map which describes, for example, curves or hills along the travel trajectory of the vehicle. Additionally or alternatively, the environment data can be, for example, speed information and/or road information, i.e., for example a state of the road, for example due to slick ice or rain, and/or a viewing direction of the operator. The environment detection device can be configured, for example, as a camera system, lidar system, radar system and/or ultrasound system.

According to a further embodiment, a mobile terminal of the operator external to the vehicle is series-coupled to the respective vehicle component and the brain wave processing device in the brain-computer communication channel. The mobile terminal forms a communication interface for signal transmission between the respective vehicle component and the brain wave processing device. The mobile terminal is interposed for the communication of the respective vehicle component and the brain wave processing device. Therefore, there is no direct control or interaction with the vehicle component, but rather an indirect one. In order to enable the communication, i.e., the data transmission, the mobile terminal can have, for example, an application (app) via which protocols for the data transmission, i.e., communication protocols, are provided. Such apps can be implemented particularly easily in mobile terminals.

By using the mobile terminal as a communication interface, it is also possible to access its services or applications by means of the brain wave processing device. For example, the mobile terminal can have an application which serves as a vehicle key, i.e., for the vehicle to be opened or closed. Therefore, interaction information, such as a control command for closing the vehicle, can be sent to the mobile terminal, and the corresponding application can be activated there. There, the control command can be verified or a new control command can be generated which is then provided directly or, for example, via an external server for controlling a locking mechanism of the vehicle. As a result, the vehicle can therefore be correspondingly opened. Additionally or alternatively, for example, a vehicle antenna can also be used as a communication module for the mobile terminal in order, for example, to make phone calls or look at films.

Additionally or alternatively, the mobile terminal can also take over data processing for the brain wave processing device. This means that the evaluation of the brain wave for determining the control signal and/or the output signal can be generated by means of a control device of the mobile terminal. The mobile terminal can be, for example, as a mobile telephone, such as a smartphone, and/or as a smart watch, and/or as a tablet.

The present disclosure also relates to a corresponding system for controlling the at least one vehicle component of the vehicle by means of the brain wave processing device. For this purpose, the system comprises the brain wave processing device and the vehicle with the at least one vehicle component. The brain wave processing device is configured to operate the respective vehicle component. The vehicle and the brain wave processing device have a respective communication module for providing a brain-computer communication channel between the brain wave processing device and the respective vehicle component. A control device of the brain wave processing device is also configured to determine a control signal which comprises a predetermined control command for the respective vehicle component as a function of a brain wave of the operator of the brain wave processing device. In addition, the control device is configured to transmit the control signal via the brain-computer communication channel. Furthermore, a control device of the vehicle is configured to control the respective vehicle component with the control signal for adapting at least the respective operating parameter in order to effect a change in its operating state. Furthermore, the control device of the vehicle is configured to generate an output signal assigned to the change in the operating state of the vehicle component and to transmit the output signal via the brain-computer communication channel. The control device of the brain wave processing device is configured to control the output unit of the brain wave processing device to output the output signal to the operator.

The control device for the vehicle and/or the brain wave processing device can have, for example, a data processing device or a processor device, that is in each case configured to carry out the corresponding processing steps for the interaction between the vehicle and the brain wave processing device. For this purpose, the processor device can have at least one microprocessor, and/or at least one microcontroller, and/or at least one FPGA (field programmable gate array), and/or at least one DSP (digital signal processor). Furthermore, the processor device can comprise program code which, when executed by the processor device, is configured to implement the embodiment of the method according to the present disclosure. The program code can be stored in a data storage device of the processor unit.

The vehicle can be configured as a motor vehicle. The vehicle is preferably configured as a motor vehicle, in particular as a passenger car or truck, or as a passenger bus or motorcycle.

The present disclosure also includes further developments of the system according to the present disclosure, which further developments comprise features as have already been described in connection with the further developments of the method according to the present disclosure. For this reason, the corresponding further developments of the system according to the present disclosure are not described again here.

The present disclosure also comprises the combinations of the features of the described embodiments. The present disclosure therefore also comprises implementations which each have a combination of the features of a plurality of the described embodiments, provided the embodiments have not been described as mutually exclusive.

The exemplary embodiments described below are preferred embodiments of the present disclosure. In the exemplary embodiments, the described components of the embodiments each represent individual features of the present disclosure that are to be considered independently of one another, each also further developing the present disclosure independently of one another. Therefore, the disclosure is also intended to include other combinations of the features of the embodiments than those described. Additionally, the described embodiments can also be complemented by additional, already described features of the present disclosure.

In FIG. 1, the same reference signs refer to functionally identical elements.

FIG. 1 shows a system 1 by means of which a vehicle component 11 of a vehicle 10 can be controlled by utilizing a brain wave processing device 20. The aim is therefore to enable the communication between the vehicle 10 and an operator 21 such as a driver, for example, by means of thoughts. For this purpose, the system 1 initially comprises the brain wave processing device 20. In the present case, the brain wave processing device 20 is configured, for example, as a microchip which is implanted in a brain of the operator 21. Alternatively, the brain wave processing device 20 can of course comprise an electrode array which is attached from the outside to the head of the operator. For example, the electrode array can be integrated in a helmet or a cap.

The brain wave processing device 20 has a stimulation unit (not shown in FIG. 1) with an electrode array. The electrode array can comprise, for example, a plurality of electrodes which can be coupled to respective nerve cells in a predetermined sensory node in the brain. For example, one or more electrodes can be coupled to my auditory nerve in the auditory cortex and/or an optic nerve in the visual cortex. For example, electrodes can be provided for each of the five base senses, i.e., sight, hearing, feel, taste and/or smell in the corresponding sensory node in the brain.

In the coupled state with the respective sensory node, the brain wave processing device 20 can now perform two different functions. On the one hand, a brain wave of the operator can be detected or read out by means of the brain wave processing device 20. For this purpose, a pulse pattern of nerve pulses can be measured by means of the electrodes. This pulse pattern represents the brain wave or a brain activity, i.e., the thoughts of the operator. On the other hand, the reverse process is also possible. A nerve stimulation for triggering an action potential in the brain can therefore be generated by applying a suitable predetermined pulse pattern consisting of predetermined electrical pulses to the electrodes. As a result, it is possible for the operator 21 to emulate or trigger sensory impressions of the corresponding five basic senses. Such a stimulation of nerve cells is already sufficiently known for example from so-called cochlear implants. Of course, corresponding stimulations are analogously conceivable for the other basic senses. By processing the nerve stimulation in the brain, information can therefore be transmitted to the inner eye or the inner hearing of the operator 21.

Furthermore, the system 1 comprises the vehicle 10. The vehicle 10 is configured, for example, as a passenger car. In the present exemplary embodiment, the vehicle 10 comprises two vehicle components 11, namely an infotainment system 11a and a driver assistance system 11b. The infotainment system can comprise, for example, a radio which is configured to receive corresponding radio signals for playing music of a desired station. The driver assistance system 11b can comprise, for example, a cruise control for setting a driving speed of the vehicle.

In addition, the vehicle 10 comprises a control device 12 for controlling the vehicle components 11. The control device 12 can be configured, for example, as a central on-board computer of the vehicle 10. By means of the control device, a corresponding control signal for changing or adapting a respective operating parameter of the respective vehicle component 11 can be generated and output. Controlling the vehicle component 11 with the control signal changes its operating state or its function. Such an operating parameter for the infotainment system 11a can be, for example, a volume or a selected station. By controlling the infotainment system Ila, for example, a volume can be set or a program selection can be made for a desired station. A corresponding operating parameter for the driver assistance system can be, for example, a speed or acceleration. By controlling the driver assistance system 11b, the vehicle can, for example, be accelerated or decelerated, i.e., the speed can be increased or reduced.

The adaptation of the respective operating parameter will then be carried out by thought-based control by the operator 21 through the brain wave processing device 20 instead of, for example, by manual control through operation of an accelerator pedal or a knob, as has been typical to date. For this purpose, a brain-computer communication channel 40 is established or provided between the brain wave processing device 20 and the respective vehicle component 11. The brain wave processing device 20 can, for example, be coupled to the vehicle 10 by the manufacturer when the vehicle is purchased so that the brain-computer communication channel 40 can be established.

The brain-computer communication channel 40 can be a wireless communication link, such as a radio link. Communication or interaction between the brain wave processing device 20 and the respective vehicle component 11 is therefore possible via the brain-computer communication channel 40. The vehicle comprises a corresponding communication module 13 for establishing the brain-computer communication channel 40. The communication module 13 can be configured, for example, as a vehicle antenna. The brain wave processing device 20 also comprises a corresponding communication module which, however, is not shown in FIG. 1 for a better overview. The communication module 13 can have, for example, an antenna system with corresponding control electronics for establishing the communication link. The control electronics of the communication module 13 can be provided, for example, by means of the control device 12 of the vehicle 10.

The brain-computer communication channel 40 is configured bidirectionally as shown in FIG. 1. This means that there can be both a data transmission from the brain wave processing device 20 to the respective vehicle component 11 and vice versa. Communication with the respective vehicle component 11 via the brain-computer communication channel 40 can take place directly or immediately. Therefore, the data to be transmitted can be exchanged or transmitted directly between the brain wave processing device 20 and the control device 12, i.e., without intermediate stations, in both directions.

Alternatively, as shown in FIG. 1, a mobile terminal 30 can be interposed as a communication interface. That is, the mobile terminal 30 is serially coupled in the brain-computer communication channel 40 to the respective vehicle component 11 and the brain wave processing device 20. By way of example, the mobile terminal 30 is shown in FIG. 1 as a smartphone. Alternatively, the mobile terminal 30 can also be configured, for example, as a smartwatch or tablet. On such a mobile terminal 30, it is particularly easy to install or implement an application, i.e., a program with a program code, which enables suitable protocols, for example for data conversion for communication between the brain wave processing device 20 and the vehicle 10. By means of the mobile terminal, a corresponding communication protocol can therefore be provided. In addition, the mobile terminal 30 as well as the data processing interface can be configured for the brain wave processing device 20 and/or the vehicle. That is, a control device of the mobile terminal 30 can take over the controlling and reading of the electrode array, for example.

With reference to FIG. 1, a corresponding transmitting and receiving process between the brain wave processing device 20 and the vehicle 10 for operating the respective vehicle component 11 will now be described by way of example. In the present case, the transmitting and receiving process will be explained with reference to the example of adapting the volume of the radio of the infotainment system 11a.

For this purpose, the brain wave of the operator 21 is first detected or measured as a pulse pattern by means of the brain wave processing device 20. The detected brain wave is transmitted to the mobile terminal for processing in the form of brain wave data 22a. By means of the control device of the mobile terminal 30, the brain wave data 22a are evaluated in order to change a corresponding control command for adapting the respective operating parameter, i.e., the volume, of the infotainment system 11a. The brain wave data 22a therefore encode the control command. In the present case, the control command can, for example, be "Set the volume of the radio to 50 percent." The component to be controlled, i.e., the radio of the infotainment system 11b and the desired change in state, i.e., the operating parameters to be controlled, namely the volume, are stored in the control command.

To assign the control command to the desired vehicle component 11 and the desired operating parameter adjustment, the mobile terminal can check whether the thought-based control command is contained, for example according to a predetermined assignment rule, in a predetermined command set with different control commands. If the detected control command matches a control command from the predetermined command set, the mobile terminal 30 can generate a corresponding control signal 22b. The control signal 22b comprises information about which vehicle component 11 is to be controlled and which operating parameter of the vehicle component 11 is to be adapted. The mobile terminal 30 transmits the control signal 22b to the control device 12 of the vehicle via the brain-computer communication channel 40. The control device 12 can evaluate the control signal 22b and generate corresponding control data 22c for controlling the desired vehicle component 11. The control data 22c can be, for example, volume control data for a volume controller of the infotainment system 11a. By controlling the infotainment system 11a with the corresponding control data 22c, the volume of the radio can therefore be adjusted in the desired manner, and in the present case set to 50 percent, for example. As a result, the operating state of the infotainment system 11a for playing music was adjusted to 50 percent volume.

The new operating state can in turn be communicated as an output signal 23c to the brain wave processing device 20. The output signal 23c can be, for example, information about the change in state and, additionally or alternatively, the new output by means of the respective vehicle component 11. In the present case, this can mean that the information that the volume of the infotainment system 11a is now 50 percent, is transmitted by means of the output signal 23c. This information can be perceived, for example, by outputting a corresponding pulse pattern for the visual cortex as a symbol before the inner eye of the operator, and/or alternatively by outputting a suitable pulse pattern by means of the electrode array in the auditory cortex, for example as a tone sequence.

In order to generate the output signal 23c, i.e., the corresponding pulse pattern for the nerve stimulation, the infotainment system 11a initially transmits corresponding operating state data 23a to the control device 12. The operating state data 23a are provided by means of the control device 12 via the communication module 13 by means of the brain-computer communication channel 40 in the form of output data 23b to the mobile terminal 30. The output data 23b can, for example, correspondingly to the operating state data 23a in compressed form. The mobile terminal 30 can receive and evaluate the output data 23b. Therefore, the mobile terminal, i.e., in particular its control device, can check the output data 23b as to which basic sense of the operator 21 is to be addressed in what way. The mobile terminal 30 can then generate the corresponding output signal 23c and send it to the brain wave processing device 20. The output signal 23c can comprise a corresponding pulse pattern with which the electrode array of the brain wave processing device 20 is to be controlled for nerve stimulation. Therefore, the desired output can be projected, for example, onto the inner eye or the inner ear of the operator 21.

In the present case, the control of the infotainment system 11a or of the driver assistance system 11b is only selected as an example. Of course, other vehicle components 11 of the vehicle 10 can also be controlled by means of the brain wave processing device 20. Various examples including but not limited to, of possible control commands for the interaction of the brain wave processing device 20 with vehicle 10 are given below:

"Open the window."

"What is the tank filling status and/or the charging state?"

"Start the charging process."

"Drive me to Berlin."

"Set the air conditioner for the driver to 20 degrees Celsius."

"Activate the seat heater."

"What will the weather be like tomorrow?"

"Are there new messages on WhatsApp?"

"Park autonomously in the parking garage."

"Pick me up downtown."

Additionally or alternatively, a control of the vehicle in the form of an emergency intervention can of course also be carried out, for example. The thought-based control command "Stop!" or "Halt!" can be used, for example, to intervene in the steering and/or cruise control of the vehicle without the driver, i.e., the operator 21 himself/herself, having to actuate the steering wheel or the brake, for example. Therefore, an evasive or braking maneuver, for example, can be initiated as quickly and efficiently as possible in order to avoid a potential collision or an accident.

A further example of controlling the vehicle 10 with the brain wave processing device 20 can consist, for example, of the vehicle 10 being opened or unlocked using the mobile terminal 30 as a key. In this case, the detected control command can, for example, be "Lock the vehicle." The use of a mobile terminal 30 as a vehicle key is generally a data-sensitive process. Therefore, the communication can take place, for example, for authorizing or authenticating the mobile terminal 30 via a vehicle-external server, such as a back-end server. Accordingly, the brain-computer communication channel 40, as shown in FIG. 1, can be expanded to include the vehicle-external server 50 as a further communication interface for the data transmission. In order to carry out the locking process, corresponding unlocking data 51 are generated with the mobile terminal 30 from the detected control command and provided to the vehicle-external server 50. The unlocking data 51 can comprise, for example, an identification feature of the mobile terminal 30 or the operator 21 and the desired unlocking command. The external server 50 can process the unlocking data and generate therefrom a corresponding unlocking signal 52. With the unlocking signal 52, the external server 50 can control the control device 12 of the vehicle 10. Said control device can then actuate a corresponding unlocking mechanism of the vehicle 10, for example for opening or unlocking the vehicle 10. The information that unlocking has occurred can then, for example, be transmitted as usual directly from the control device 12 to the mobile terminal 30 and then to the brain wave processing device 20. Alternatively, the communication path via the external servers 50 and to the mobile terminal 30 as well as the brain wave processing device 20 can of course also be selected.

To establish the brain-computer communication channel 40 and, for example, to prevent undesired external access, it is possible for an activation signal with a corresponding activation command to be provided to the control device 12 prior to an interaction of the brain wave processing device 20 with the vehicle 10. As a control command, the activation signal can comprise, for example, a password or passphrase that was acquired from the brain wave data 22a. This can also ensure that the vehicle or the brain wave processing device 20 detects a specific command and, for example, does not respond to normal thoughts of the operator 21.

Overall, the examples show brain-to-car communication (B2CC), i.e., communication can be implemented between the brain and the vehicle 10.

The invention claimed is:

1. A method for operating at least one vehicle component of a vehicle, the method comprising:

providing a brain-computer communication channel between a brain wave processing device and a respective vehicle component;

detecting, by a mobile terminal, a brain wave of an operator, the brain wave comprising a control command, wherein the mobile terminal is located outside the brain wave processing device and outside the vehicle;

comparing, by the mobile terminal, the control command with a plurality of predetermined control commands of a command set;

generating, by the mobile terminal, based on finding a match between the control command and a predetermined control command of the plurality of predetermined control command, a control signal comprising information regarding the at least one vehicle component to be controlled and an at least one vehicle operating parameter of the at least one vehicle component to be adapted;

transmitting the control signal via the brain-computer communication channel resulting in adapting the at least one vehicle operating parameter of the at least one vehicle component, thereby causing a change in the operating state of the at least one vehicle component;

generating an output signal assigned to the change in the operating state of the at least one vehicle component; and transmitting the output signal via the brain-computer communication channel to the brain wave processing device for outputting the output signal to the operator by means of an output unit of the brain wave processing device.

2. The method of claim 1, wherein adapting at least one operating parameter of the at least one vehicle component comprises adapting at least one of the following:

a driving setting of a driver assistance system, a navigation setting of a navigation device, a setting of an infotainment system, a comfort setting of a comfort system for the operator, a setting of at least one actuator of the vehicle configured to control at least one vehicle component, and a setting of a data interface and/or communication interface of the vehicle, wherein the setting is configured for data transmission with a vehicle-external communication unit, in particular a server device.

3. The method of claim 2, further comprising:

detecting a value of the at least one vehicle operating parameter predetermined by the control command by means of a detection device of the vehicle;

comparing the detected value of the at least one vehicle operating parameter to a current value of the environmental data; and verifying a control command that relates to an adaptation of the driving setting as the at least one vehicle operating parameter of a driver assistance system prior to execution.

4. The method of claim 1, further comprising:

determining a control command from the detected brain wave in order to determine the control signal; and assigning the determined control command to the at least one vehicle component according to a predetermined assignment rule, wherein the control signal is specified depending on the at least one vehicle component encoded in the control command and on a desired change in the operating state encoded in the control command.

5. The method of claim 1, further comprising providing an acoustic, and/or optic, and/or haptic, and/or olfactory, and/or gustatory signal as the output signal.

6. The method of claim 1, further comprising:

detecting the brain wave of the operator using the brain wave processing device with an electrode array for attachment to a head or to at least be in a predetermined vicinity of the head of the operator; and outputting the output signal using the brain wave processing device that has a display device, and/or speaker system, and/or a vibration system.

7. The method of claim 1, further comprising:

detecting the brain wave and outputting the output signal using a stimulation unit with an electrode array within the brain wave processing device;

detecting nerve pulses that form the brain wave of the operator using the stimulation unit; and converting the output signal into a predetermined pulse pattern using the stimulation unit, the output signal comprising predetermined electrical pulses for the electrode array for nerve stimulation for triggering an action potential.

8. The method of claim 1, further comprising enabling the brain-computer communication channel and/or the use of the control signal for controlling the at least one vehicle component in response to detecting an activation signal by means of an activation device assigned to the at least one vehicle component.

9. The method of claim 1, further comprising:

serially coupling a vehicle-external mobile terminal of the operator to the at least one vehicle component and the brain wave processing device in the brain-computer communication channel, wherein the vehicle-external mobile terminal forms a communication interface for a signal transmission between the at least one vehicle component and the brain wave processing device.

10. A system comprising:

a brain wave processing device;

a vehicle having at least one vehicle component, wherein the brain wave processing device is configured to operate the at least one vehicle component;

a communication module for the vehicle and the brain wave processing device for providing a brain-computer communication channel between the brain wave processing device and the at least one vehicle component;

a mobile terminal located outside the brain wave processing device and outside the vehicle, wherein the mobile terminal is configured to:

communicate via the communication module;

detect a brain wave comprising a control command;

compare the control command with a plurality of predetermined control commands of a command set;

generate, based on finding a match between the control command and a predetermined control command of the plurality of predetermined control commands, a control signal comprising information regarding the at least one vehicle component to be controlled and an at least one vehicle operating parameter of the at least one vehicle component to be adapted; and transmit the control signal via the brain-computer com-
munication channel; and a control device of the vehicle configured to:

receive the control signal transmitted by the mobile
terminal;

control the at least one vehicle component with the
control signal for adapting at least one operating
parameter in order to effect a change in its operating
state; and generate an output signal assigned to the change in the
operating state of the at least one vehicle component
and to transmit the output signal via the brain-computer
communication channel; and the mobile terminal being further configured to control
an output unit of the brain wave processing device to
output the output signal to an operator.

*    *    *    *    *